United States Patent [19]

Furuyama

[11] Patent Number: 5,003,816

[45] Date of Patent: Apr. 2, 1991

[54] ENGINE IDLING CONTROL APPARATUS

[75] Inventor: Masaaki Furuyama, Tokyo, Japan

[73] Assignee: Fuji Jukogyo Kabushiki Kaisha, Tokyo, Japan

[21] Appl. No.: 441,260

[22] Filed: Nov. 27, 1989

[30] Foreign Application Priority Data

Nov. 30, 1988 [JP] Japan ............................ 63-303412

[51] Int. Cl.[5] ............................ G01M 15/00

[52] U.S. Cl. ............................ 73/117.3

[58] Field of Search ............ 73/116, 117.2, 117.3, 73/118.1; 123/339; 364/424.01, 426.01

[56] References Cited

U.S. PATENT DOCUMENTS 4,930,079 5/1990 Kondo ............................ 73/118.1

FOREIGN PATENT DOCUMENTS 0000639 1/1987 Japan ............................ 123/339

*Primary Examiner*—Robert Raevis

*Attorney, Agent, or Firm*—Beveridge, DeGrandi & Weilacher

[57] ABSTRACT

An engine idling control apparatus having an idle switch which turns on/off in response to the open/close of a throttle valve and judging the idle state in accordance with the open/close operation of the idle switch. The idle switch state is judged by an idle switch state judging unit in accordance with the on/off the idle switch. When it is judged as the idle state, the max/min value of an output from a throttle valve sensor for detecting the opening degree of the throttle valve is detected by a max/min value detecting unit. A max/min value updating unit compares the detected max/min value with an already stored max/min value, and updates the already stored max/min value to store the updated max/min value. In accordance with the updated max/min value, a comparison reference value setting unit sets an idle judgement comparison reference value which is compared by an idle state judging unit with an output from the throttle valve sensor to judge if the engine is in an idle state or not. The idle switch is arranged to be turned on/off at the point where the throttle valve is opened slightly from its fully closed state.

5 Claims, 7 Drawing Sheets

ENGINE IDLING CONTROL APPARATUS

BACKGROUND OF THE INVENTION

The present invention relates to an engine idling control apparatus which judges an engine idling state from an output signal of a throttle sensor.

During an idling operation of an engine, the engine speed is set to a predetermined value by regulating the area of the bypass with an idle speed control valve (ISCV), and the ignition timings are set to have a predetermined lead angle.

An engine idling operation has been mechanically judged by an idling switch. If the switch is ON, it is unconditionally judged that the throttle valve is closed, i.e., in an idling state, and the engine is set to the idling state.

In practice, however, as shown in FIG. 8, since it is necessary to certainly turn ON the idle switch when the throttle valve is fully closed, the idle switch is arranged to turn ON (on the basis of which the throttle valve is mechanically judged as fully closed) at an opening degree ($\theta 0$) before the throttle valve is fully closed. As a result, if the acceleration pedal is depressed to start the engine, although the engine speed rises, the idling control is not released until the throttle valve is opened to the predetermined opening degree $\theta 0$. Further, if the acceleration pedal is released during a deceleration operation, although the throttle valve is still open, the idling control starts when the throttle valve opening degree takes the value $\theta 0$.

In case of the conventional engine, under such conditions that the idle switch does not turn OFF (which is judged as a fully closed state of the throttle valve) even if the valve is still open, and that the idle switch turns ON before the valve is fully closed, an area change ratio of a throttle bore and hence a changing range of intake air quantity are small so that the starting, acceleration and the deceleration performance do not improve largely.

Latest engines, however, have a throttle with a large bore diameter so as to obtain a high performance and high output power. Even a small change in throttle valve opening degree will therefore result in a large change in intake air quantity. If the idling control is continued under the condition that the throttle valve is opened from the fully closed state and the engine speed rises, the start running and acceleration performance is degraded because of insufficient power. Further, if the idling control starts in response to an output signal from the idle switch before the throttle valve is fully closed, the deceleration performance is degraded. Not only the start, acceleration and deceleration performance are degraded, but also a proper air-fuel ratio control is not possible and an exhaust gas emission and fuel consumption are deteriorated. The controllability of idling operation is also decreased largely.

In order to deal with the above problems, it can be considered that the idle switch may be set near a fully closed position of the throttle valve so as to ensure a proper ON/OFF. However, the distance between switching contacts has the limit and setting such distance is practically difficult, so that this arrangement is not suitable for mass production and is hard to be realized.

Apart from the above, there is disclosed in, e.g., Japanese Patent Publication No. 63-15467, an idling control technique wherein the minimum value of a throttle opening degree is updated in accordance with an output signal from a throttle valve sensor, and stored in a memory. When the output value of the throttle valve sensor becomes as small as the minimum value stored in the memory, it is judged as the fully closed state (idle state) of the throttle valve.

According to this related technique, even during the OFF state of the idle switch, a fast idle mechanism operates to forcibly open the throttle valve to thereby allow the idling control. It has also been considered to apply this technique to an engine using ISCV as the fast idle mechanism to correct the physical displacement between the idle switch and throttle valve opening degree, i.e., correcting with software the condition that even the idle switch is ON, the throttle valve is actually open. This correction is so complicated that it is hard to be realized in practice.

Further, if the output value of the throttle valve sensor exceeds the stored minimum value even by one bit (minimum resolution), it is judged as the non-idling state. It is therefore likely to occur hunting between idling control and non-idling control relative to the minimum value. The controllability of not only idling operation but also air-fuel ratio is deteriorated. Furthermore, if the output value of the throttle position sensor lowers largely due to disturbances, this value is stored as the minimum value so that the idle state is hardly judged thereafter.

SUMMARY OF THE INVENTION

The present invention has been made in consideration of the above circumstances. An object of the present invention is to provide an engine idling control apparatus capable of correctly judging the fully closed state of a throttle valve without a severe setting of an idle switch.

An engine idling control apparatus of this invention comprises: idle switch state judging means for judging a mechanical idling state from an output signal of an idle switch; max/min value learning means for detecting a maximum and minimum values of output of a throttle position sensor representing the throttle valve opening degree, when the idle switch state judging means judged the mechanical idling state, and for updating the maximum and minimum values; comparison reference value setting means for setting a comparison reference value used for judging proper idling state, in accordance with the maximum and minimum values of output of the throttle position sensor updated by the max/min value learning means; and idling state judging means for judging proper idling state, through comparison of the idling state judgement comparison reference value set by the comparison reference value setting means with output of the throttle position sensor.

With the engine idling control apparatus constructed as above, it is first judged from output signal of the idle switch if the present operation of the engine is in a mechanical idling state or not. If it is judged as the mechanical idling state, there are detected the maximum and minimum values of output of the throttle position sensor representing the throttle valve opening degree.

The maximum and minimum values of output of the throttle position sensor are updated. The idling judgement comparison reference value is set in accordance with the updated maximum and minimum values of output of the throttle position sensor. The proper idling state is judged through comparison of the idling judgement comparison reference value with output of the throttle position sensor.

BRIEF DESCRIPTION OF THE DRAWINGS

FIGS. 1 to 7 show an embodiment of the engine idling control apparatus according to the present invention, wherein FIG. 1 is a functional block diagram of a control unit to decide an idling state;

FIG. 2 shows the outline of an engine control system;

FIG. 3 is a flow chart illustrating the updating procedure of the max/min value of an output of a throttle position sensor; and FIG. 4 is a flow chart illustrating the idling state judging procedure;

FIGS. 5 to 7 are timing charts for outputs of the throttle position sensor, idle switch, and idling state judging signal; wherein FIG. 5 is a timing chart for the case where an acceleration pedal is released and the engine is started;

FIG. 6 is a timing chart for the case of slightly acceleration at a vehicle start; and FIG. 7 is a timing chart for the case of largely acceleration at the vehicle start.

DETAILED DESCRIPTION OF THE PREFERRED EMBODIMENT

A preferred embodiment of the present invention will become understood from the following detailed description referring to the accompanying drawings.

Figure 2:
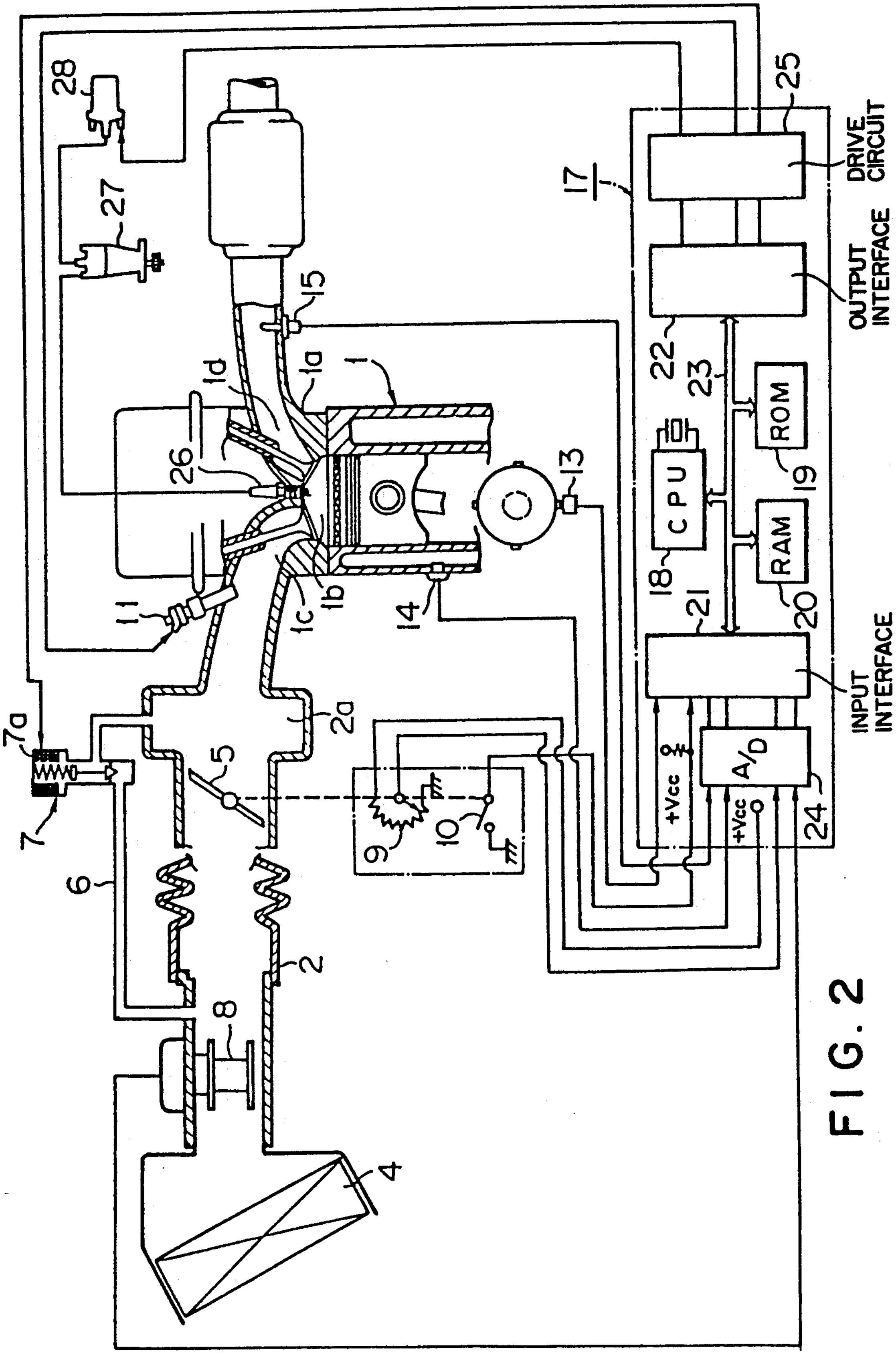

In FIG. 2, reference numeral 1 represents an engine (main) body. There are formed in a cylinder head 1*a* of the engine (main) body 1 an intake port 1*c* and exhaust port 1*d* opened respectively to a combustion chamber 1*b*. The intake (air) port 1*c* communicates with an air intake conduit 2, and the exhaust port 1*d* with an exhaust conduit 3. There is mounted an air cleaner 4 at the upstream of the intake air conduit 2. There is also mounted a throttle valve 5 at the midst of the intake air conduit 2. An air chamber 2*a* is formed at the immediate downstream of the throttle valve 5.

An air bypass 6 communicates with the intake air conduit 2, the bypass provided the throttle valve 5. An idle speed control valve (ISCV) 7 is mounted at the air bypass 6.

An intake air quantity sensor (hot wire type air flow meter is shown) 8 is mounted within the intake air conduit 2 at the immediate downstream of the air cleaner 4. A throttle position sensor 9 and an idle switch 10 are mounted on the throttle valve 5 in cooperative relation to each other. In order to ensure a certain operation of the idle switch 10, it is set so as to be turned ON/OFF at the opening degree slightly opened from the fully closed state of the throttle valve 5.

Circuit Arrangement of Control Unit

Reference numeral 17 represents a control unit made of a microcomputer (and the like). A central processing unit (CPU) 18, a ROM 19, a RAM 20, an input interface 21 and an output interface 22 of the control unit 17 are interconnected via a bus line 23.

The idle switch 10 and a crank angle sensor 13 are connected to the input interface 21 to which also connected via an A/D converter 24 are the intake air quantity sensor 8, throttle valve sensor 9, a coolant temperature sensor 14, and an $O_2$ sensor 15.

An injector 11 and a coil 7*a* of ISCV 7 are connected via a drive circuit 25 to the output interface 22 to which also connected via a distributor 27 and an ignitor 28 is an ignition plug 26.

The ROM 19 stores therein fixed data and control programs. The RAM 20 stores therein processed signals inputted to the input interface 21, and data processed by the CPU 18. The control unit 17 performs air-fuel control, ignition timing control and idle speed control by using various data stored in the RAM 20, in accordance with the control programs stored in the ROM 19.

Function and Structure of Idle State Determining Means

Figure 1:
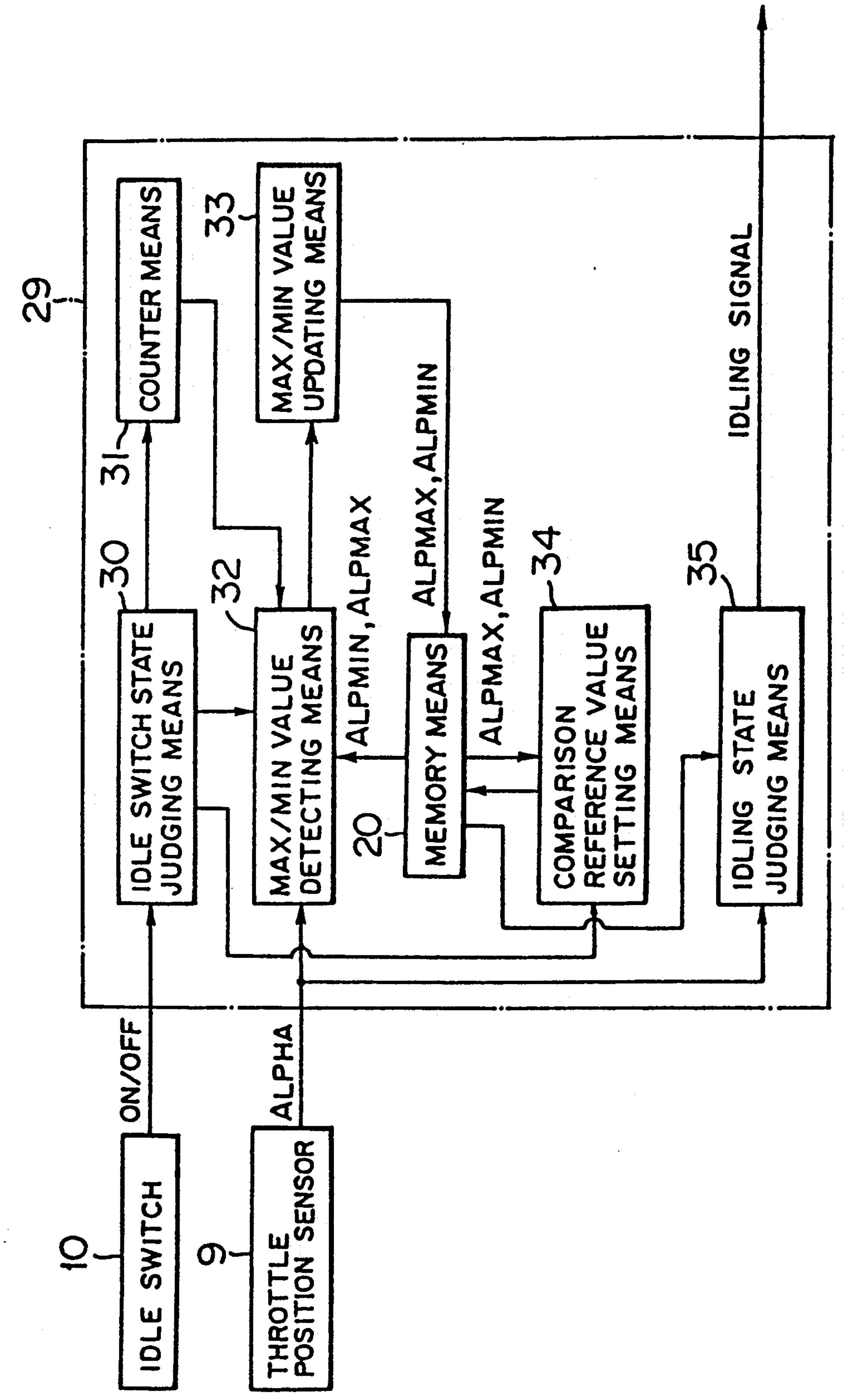

As shown in FIG. 1, idle state determining system 29 in the control unit 17 is constructed of idle switch state judging means 30, counter means 31, max/min value detecting means 32, max/min value updating means 33, memory means (RAM) 20, comparison reference value setting means 34, and idling state judging means 35.

The idle switch state judging means 30 immediately judges from an output signal of the mechanical idle switch 10 if the idle switch 10 is in an idle state (ON) or not (OFF). While taking a detection error into consideration and in order to ensure a reliable operation, the idle switch 10 turns ON at the throttle valve opening degree smaller than a predetermined opening degree $\theta 0$ ($\theta < \theta 0$) and turns OFF at the throttle valve opening degree larger than or equal to the predetermined opening degree $\theta 0$ ($\theta \geqq \theta 0$).

The counter means 31 starts counting when the output signal from the idle switch state judging means 30 changes from ON to OFF or vice versa. The counter means 31 outputs a trigger signal to the max/min value detecting means 32 if the idle switch 10 holds an ON state or OFF state for a predetermined period (e.g., 10 msec).

The max/min value detecting means 32 reads an output value ALPHA from the throttle position sensor 9 if a trigger signal is outputted from the counter means 31 and the idle switch state judging means 30 judges the idling state, i.e., if a trigger signal is outputted every time the ON state of the idle switch 10 continues for the predetermined period (e.g., 10 msec). The output value ALPHA is compared with a maximum output value ALPMAX and minimum value ALPMIN stored in the memory means (RAM) 20.

The max/min value detecting means 32 determines if the output value ALPHA of the throttle position sensor 9 is larger than the maximum output value ALPMAX (ALPHA >ALPMAX) or smaller than the minimum output value ALPMIN (ALPHA <ALPMIN). The max/min value updating means 33 updates the maximum output value ALPMAX or minimum output value ALPMIN stored in the memory means 20 to the output value ALPHA of the throttle position sensor 9 when ALPHA >ALPMAX or ALPHA <ALPMIN.

The max/min value updating means 33 stops reading the output value ALPHA of the throttle position sensor 9 if a trigger signal is outputted from the counter means 31 and the idle switch state judging means 30 judges the OFF state of the idle switch 10, i.e., if the OFF state of the idle switch 10 continues for the predetermined period. Thereafter, the max/min value updating means 33 subtracts a setting value DELTID from the maximum output value ALPMAX and adds the setting value DELTID to the minimum output value ALPMIN, to thereby change the maximum output value ALPMAX and minimum output value ALPMIN to the subtraction and addition results, respectively (ALPMAX ←ALPMAX−DELTID, ALPMIN ←ALPMIN+DELTID).

When ALPMAX becomes smaller than ALPMIN, ALPMAX is set to ALPMIN and the updating is stopped until the ON state of the idle switch 10 continues for the predetermined period.

The comparison reference value setting means 34 reads the judgement result at the idle switch state judging means 30. If the idle switch 10 takes the ON state, the maximum and minimum output values ALPMAX and ALPMIN stored in the memory means 20 are compared with each other to set an idling judgement comparison reference value ALPISW in accordance with the difference between the maximum and minimum output values. The updated idling judgement comparison reference value ALPISW is stored in the memory means 20 at an address different from those addresses at which the maximum and minimum output values are stored. If the idle switch 10 takes the OFF state, updating the comparison reference value ALPISW is stopped.

The idle state judging means 35 reads from the memory means 20 the idling judgement comparison reference value ALPISW set by the comparison reference value setting means 34. The read idling judgement comparison reference value ALPISW is compared with the output value ALPHA of the throttle position sensor 9 to accordingly judge whether the present operation state is an idling state or not.

Operation

Figure 3:
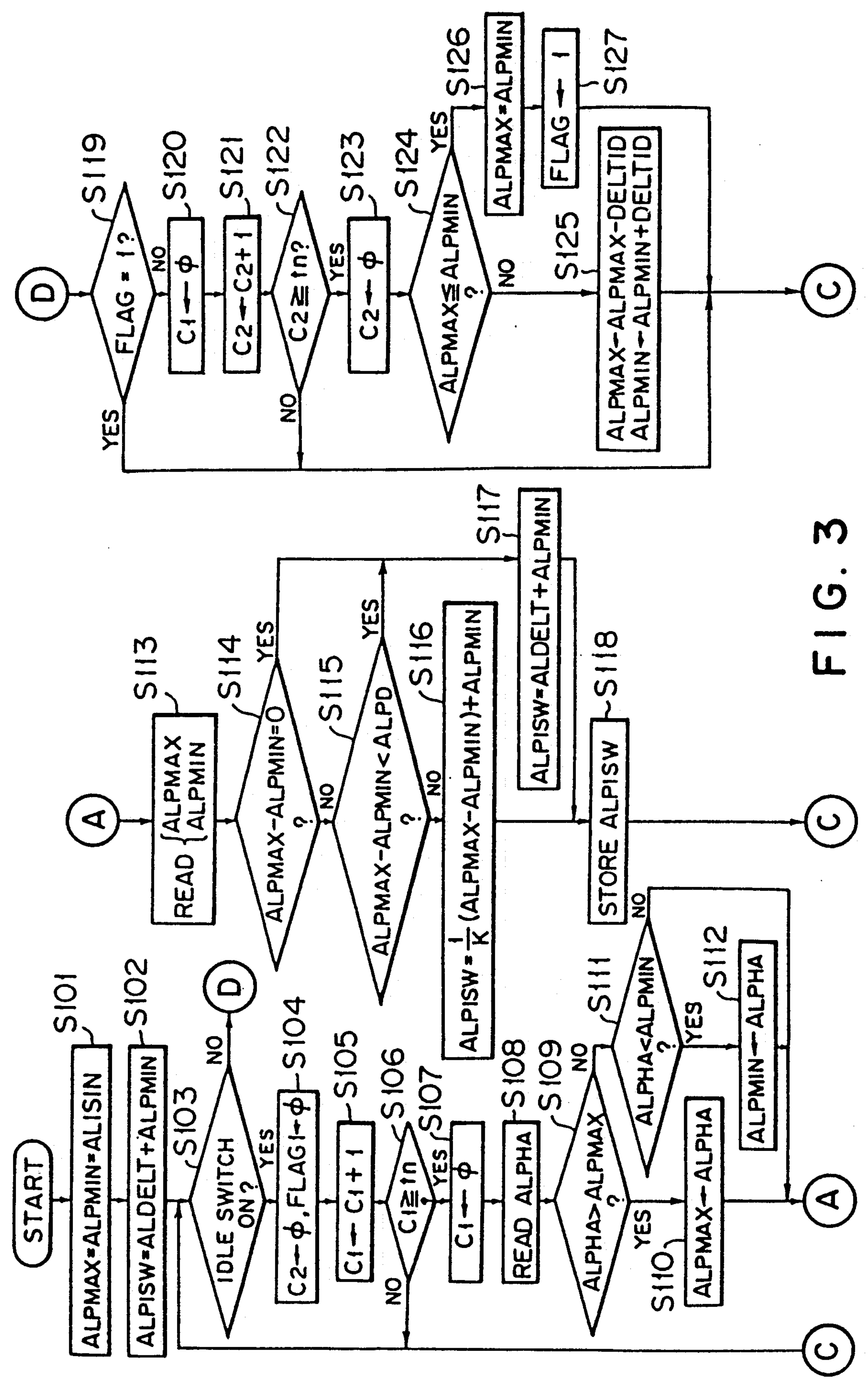

Next, the operation of the idling state determining system 29 constructed as above will be described with reference to the flow charts shown in FIGS. 3 and 4. (Updating Procedure of Max/min Values Outputted from Throttle Position Sensor and Idling Judgement Comparison Reference Value)

During Starting Operation

When an ignition switch is turned on, the power supply of the control unit 17 is turned on. As shown in FIG. 3, at a step S101, the maximum and minimum output values ALPMAX and ALPMIN stored in the memory means 20 are initialized to a set value ALISIN previously obtained from experiments or the like on the assumption that the maximum and minimum output values ALPMAX and ALPMIN are the same at turning on the power supply (ALPMAX =ALPMIN =ALISIN).

This set value, for example, is an average value of an output value of the throttle position sensor 9 when the throttle valve 5 is fully closed, and an output value when the idle switch 10 is changed from the ON state to the OFF state.

The maximum and minimum output values ALPMAX and ALPMIN are initialized to the set value ALISIN immediately after the power supply of the control unit 17 is turned on in order to definitely determine an initial set value. The reason is that the throttle valve may take a position not fully closed, immediately after the power supply of the control unit 17 is turned on, so that the output value of the throttle position sensor 9 is indefinite and also changes by the deterioration by long use of the throttle position sensor 9.

Next, at a step S102 after initialization at the step S101, the set value ALDELT is added to the minimum output value ALPMIN to set the idling state judgement comparison reference value ALPISW (=ALPMIN+ALDELT) which is stored in the memory means (RAM) 20 at the predetermined address.

Thereafter, it is judged at a step S103 if the idle switch 10 is ON or OFF. If ON, i.e., if the idling state has been mechanically detected, the control advances to a step S104. Alternatively, if OFF, i.e., if the nonidling state has been mechanically detected, the control advances to a step S119.

For example, if the engine is started while releasing the acceleration pedal, the idle switch is in the ON state so that the control advances to the step S104. At the step S104, a counter C2 and an update interception flag FLG1 are cleared, the counter C2 detecting the period in the OFF state of the idle switch 10 (C2←Φ, FLG1 ←Φ).

Next, at a step S105, a counter C1 to detect the period in the ON state of the idle switch 10 is incremented by 1 (C1 ←C1+1). At a step S106, the contents of the counter C1 incremented at the step S105 upon the idling state, are compared with the set value tn (e.g., 10 msec). If C1 <tn, the control returns to the step S103. If C1 ≧tn, i.e., if the ON state of the idle switch 10 continues for the predetermined period tn or longer, the control advances to a step S107 whereat the idling state counter C1 is cleared (C1 ←Φ), and at a step S108 the output value ALPHA is read from the throttle position sensor 9.

Next, at a step S109, the output value ALPHA read from the throttle position sensor 9 at the step S108 is compared with the maximum output value ALPMAX (=ALPMIN=ALISIN) set at the initialization at the step S101.

If the engine is started while releasing the acceleration pedal, since the maximum output value ALPMAX has been initialized to a relatively large value, the output value ALPHA of the throttle position sensor 9 read at the step A108 is low, i.e., ALPHA <ALPMAX. The control therefore advances to a step S111 whereat the output value ALPHA is compared with the minimum output value ALPMIN initialized at the step S101. This initialized minimum output value ALPMIN is equal to the maximum output value ALPMAX, so that ALPHA is smaller than ALPMIN. The control therefore advances to a step S112 whereat the minimum output value ALPMIN stored in the memory means 20 is updated to the output value ALPHA of the throttle position sensor 9 read at the step S108 (ALPMIN←ALPHA), to thereafter advance to a step S113.

At the step S113, the latest maximum and minimum output values ALPMAX and ALPMIN stored in the memory means 20 are read. It is checked if the maximum and minimum output values ALPMAX and ALPMIN read at the step S113 are equal to each other or not. If ALPMAX−ALPMIN ≠0, the control advances to a step S115. If ALPMAX−ALPMIN =0, the control advances to a step S117.

If it is judged at a step S114 that ALPMAX−ALPMIN <≠0 and the control advances to the step S115, the difference between the maximum output value ALPMAX and minimum output value ALPMIN read at the step S113 is compared with the set value ALPD. If ALPMAX−ALPMIN <ALPD, the control advances to the step S117. If ALPMAX−ALPMIN ≧ALPD, the control advances to the step S116.

The set value ALPD represents a change amount limit to avoid an erroneous judgement which might occur because of a small difference between the maximum and minimum output values ALPMAX and ALPMIN. The set value ALPD is obtained from experiments or the like and stored beforehand in the ROM 19.

In the case where the engine is started while the acceleration pedal is released, the output value ALPHA of the throttle position sensor 9 read at the step S108 is smaller than the minimum output value ALPMIN (=ALISIN) initialized at the step S101 so that the minimum output value ALPMIN is updated at the step S112. In this case, since the maximum output value ALPMAX still takes the set value ALISIN so that ALPMAX−ALPMIN ≠0 and ALPMAX−ALPMIN ≧ALPD to therefore advance to the step S116 via the step S115.

At the step S116, the idling judgement comparison reference value ALPISW is calculated from the following formula by using the maximum and minimum output values ALPMAX and ALPMIN read at the step S13.

$$ALPISW = 1/K(ALPMAX - ALPMIN) + ALPMIN \quad (1)$$

where K is a constant.

Figure 5:
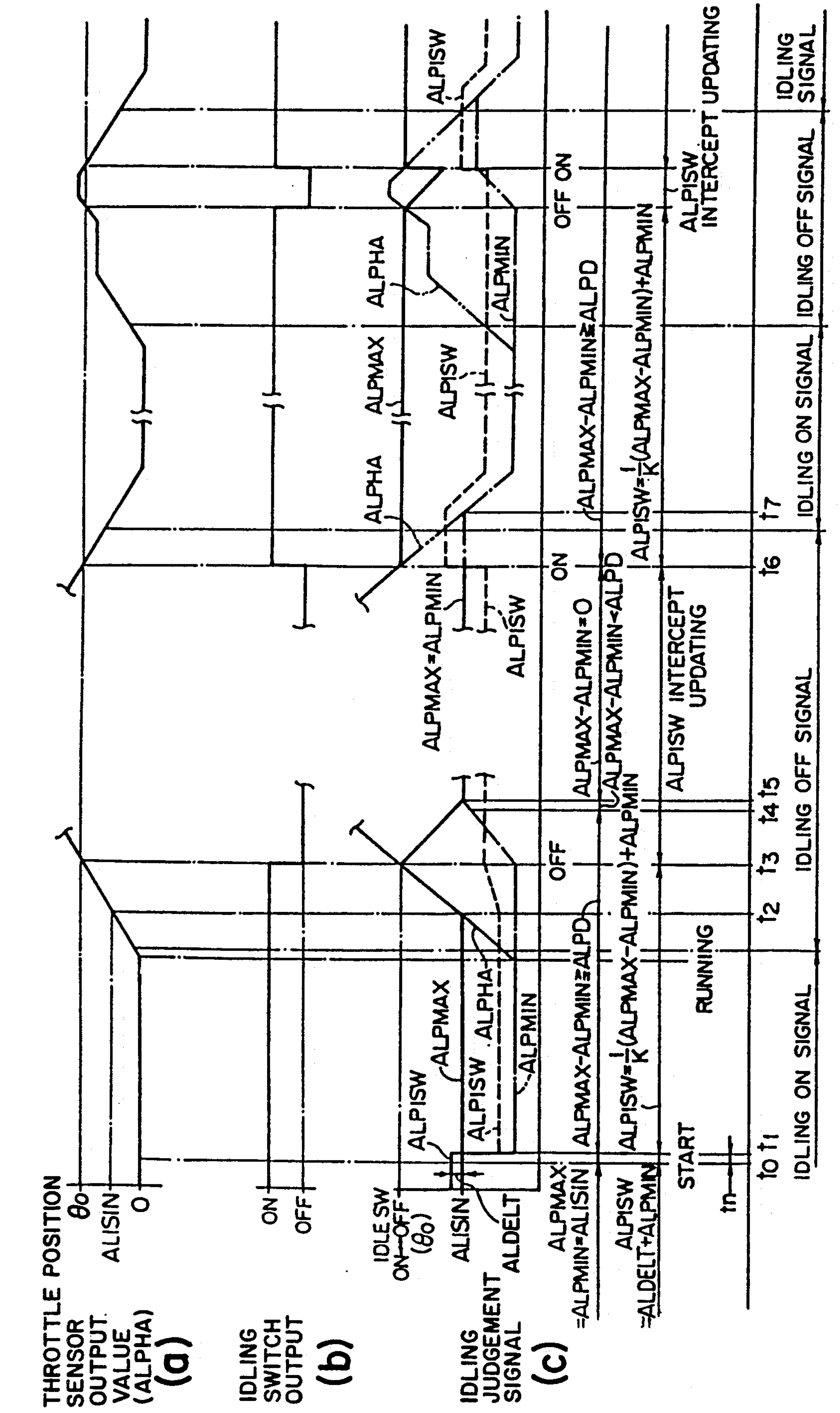

At the step S118, the idling judgement comparison reference value ALPISW stored in the memory means 20 at a predetermined address is updated to the idling judgement comparison reference value ALPISW calculated by the formula (1), and the control returns to the step S103 (lapsed time t1 shown in FIG. 5).

In the case where the acceleration pedal is slightly depressed and the engine is started during the ON state of the idle switch 10, if the output value ALPHA of the throttle position sensor 9 is in the vicinity of ALPISW, it becomes that ALPMAX−ALPMIN=0 or ALPMAX−ALPMIN <ALPD so that the control advances to the step S117 via the step S114 or the step S115. Then, the idling judgement comparison reference value ALPISW is calculated from the following formula by using the minimum output value ALPMIN read at the step S113.

$$ALPISW = ALDELT + ALPMIN \quad (2)$$

where ALDELT is a set value. Thereafter, the control advances to the step S118 whereat the idling judgement comparison reference value ALPISW stored in the memory means 20 at a predetermined address is updated to the idling judgement comparison reference value ALPISW calculated by the formula (2) and the control returns to the step S103 (lapsed time t0 to t12 shown in FIG. 6).

In the case where the acceleration pedal is depressed and the engine is started during the OFF state of the idle switch, the control advances from the step S103 to the step S119. In this case, the idling judgement comparison reference value ALPISW initialized at the step S102 is remained without updating (lapsed time t0 to t21 shown in FIG. 7).

The constant K in the formula (1) and set value ALDELT in the formula (2) are obtained beforehand from experiments (or the like), and stored in the ROM 19. If the minimum output value ALPMIN is used as the idling judgement comparison reference value ALPISW and the output value ALPHA of the throttle position sensor 9 becomes larger than the minimum output value ALPMIN by 1bit (minimum resolution) due to drift, an erroneous judgement as the non-idling state is made in spite of the fully closed state of the throttle valve 5. According to this embodiment, however, the correction value 1/K(ALPMAX −ALPMIN) or ALDELT at the first term of the formula (1) or (2) is added to the minimum output value ALPMIN, and this corrected value is used as the idling judgement comparison reference value ALPISW. Accordingly, even if the output value ALPHA becomes larger than the minimum output value ALPMIN by 1 bit (minimum resolution), an erroneous idling state judgement as the non-idling state can be avoided. From the experiments, it is desirous that the constant K is 4.

During Idling Operation

When the engine enters into the idling operation (the throttle valve is fully closed while releasing the acceleration pedal), the above-described program from the step S103 to the step S108 is executed, and at the steps S109 and S111, the output value ALPHA of the throttle position sensor 9 read at the step S108 is compared with the latest maximum and minimum output values ALPMAX and ALPMIN stored in the memory means 20.

The maximum output value ALPMAX stored in the memory means 20 immediately after the engine start is the set value ALISIN initialized at the step S101. When the acceleration pedal is released and the engine is started and entered into the idling operation, the output value ALPHA of the throttle position sensor 9 read at the step S108 is smaller than or equal to the maximum output value ALPMAX (=ALISIN) (ALPHA ≦ALPMAX), so that the control advances from the step S109 to the step S111. Since the output value ALPHA of the throttle position sensor 9 is unchanged after the minimum output value ALPMIN was updated to the output value ALPHA at the previous routine when the acceleration pedal was released and the engine was started, the control jumps from the step S111 to the step S113 without updating the maximum and minimum output values ALPMAX and ALPMIN stored in the memory means 20. In this case, the maximum and minimum output values ALPMAX and ALPMIN read at the step S113 are also the same as values ALPMAX and ALPMIN read at the previous routine so that the control advances to step S116 via the steps S114 and S115 to thereby calculate the idling judgement comparison reference value ALPISW.

The calculated idling judgement comparison reference value ALPISW is also the same as value ALPISW calculated at the step S116 in the previous routine. The idling judgement comparison reference value ALPISW is updated and stored at the step S118 which value is the same value at the previous routine. Thereafter, the control returns to the step S103 (lapsed time t1 to t2 shown in FIG. 5).

In the case where the engine enters into the idling operation upon release of the acceleration pedal after the acceleration pedal is slightly depressed and the engine is started during the ON state of the idle switch 10, the output value ALPHA of the throttle position sensor 9 read at the step S108 becomes smaller than the minimum output value ALPMIN (=ALISIN) (ALPHA <ALPMIN) because both the maximum and minimum output values ALPMAX and ALPMIN stored in the memory means 20 immediately after the engine start are initialized to the set value ALISIN at the step S101. The control therefore advances to the step S111 via the steps S109 and S111. The maximum output value ALPMAX stored in the memory means 20 is updated to the output value ALPHA read at the step S108. Thereafter, at the step S113, the maximum and minimum output values ALPMAX and ALPMIN are read from the memory means 20.

Since the maximum output value ALPMAX is the set value ALISIN itself, it becomes that ALPMAX−ALPMIN $\neq 0$ and ALPMAX−ALPMIN$\geqq$ALPD. The control therefore advances via the steps S114 and S115 to the step S116 whereat the idling judgement comparison reference value ALPISW is calculated from the formula (1) and the idling judgement comparison reference value ALPISW stored in the memory means 20 at the predetermined address is updated to the calculated comparison reference value ALPISW (lapsed time t12 to t13 shown in FIG. 6).

Thereafter, the engine enters completely into the idling operation. If the idling operation continues, the maximum and minimum output values ALPMAX and ALPMIN are not updated, and the idling judgement comparison reference value ALPISW is maintained to have a constant value.

In the case where the engine enters into the idling operation upon release of the acceleration pedal after the acceleration pedal is largely depressed and the engine is started during the OFF state of the idle switch 10, the idle switch 10 changes from the OFF state to the ON state so that the control advances from the step S103 to the step S104. The above-described program from the step S104 to the step S108 is executed. Thereafter, at the step S109 the output value ALPHA of the throttle position sensor 9 read at the step S108 is compared with the maximum output value ALPMAX stored in the memory means 20.

Immediately after the idle switch 10 changes from the OFF state to the ON state, the output value ALPHA of the throttle position sensor 9 gradually decreases from its large value to a small value, and the maximum output value ALPMAX stored in the memory means 20 is equal to the set value ALISIN set at step S101. Accordingly, the output value ALPHA read at the step S108 is larger than the maximum output value ALPMAX stored in the memory means 20 (ALPHA >ALPMAX). The control therefore advances from the step S109 to the step S110 whereat the maximum output value ALPMAX stored in the memory means 20 is updated to the output value ALPHA read at the step S108 (ALPMAX ←ALPHA). At the step S113 the maximum and minimum output values ALPMAX and ALPMIN are read from the memory means 20.

Since the minimum output value ALPMIN is equal to the set value ALISIN itself, it becomes that ALPMAX−ALPMIN $\neq 0$ and ALPMAX−ALPMIN $\geqq$ALPD. The control therefore advances via the steps S114 and S115 to the step S116 whereat the idling judgement comparison reference value ALPISW is calculated from the formula (1) and the idling judgement comparison reference value ALPISW stored in the memory means 20 at the predetermined address is updated to the calculated comparison reference value ALPISW. Thereafter the control returns to the step S103 (lapsed time t21 to t22 shown in FIG. 7).

Figure 7:
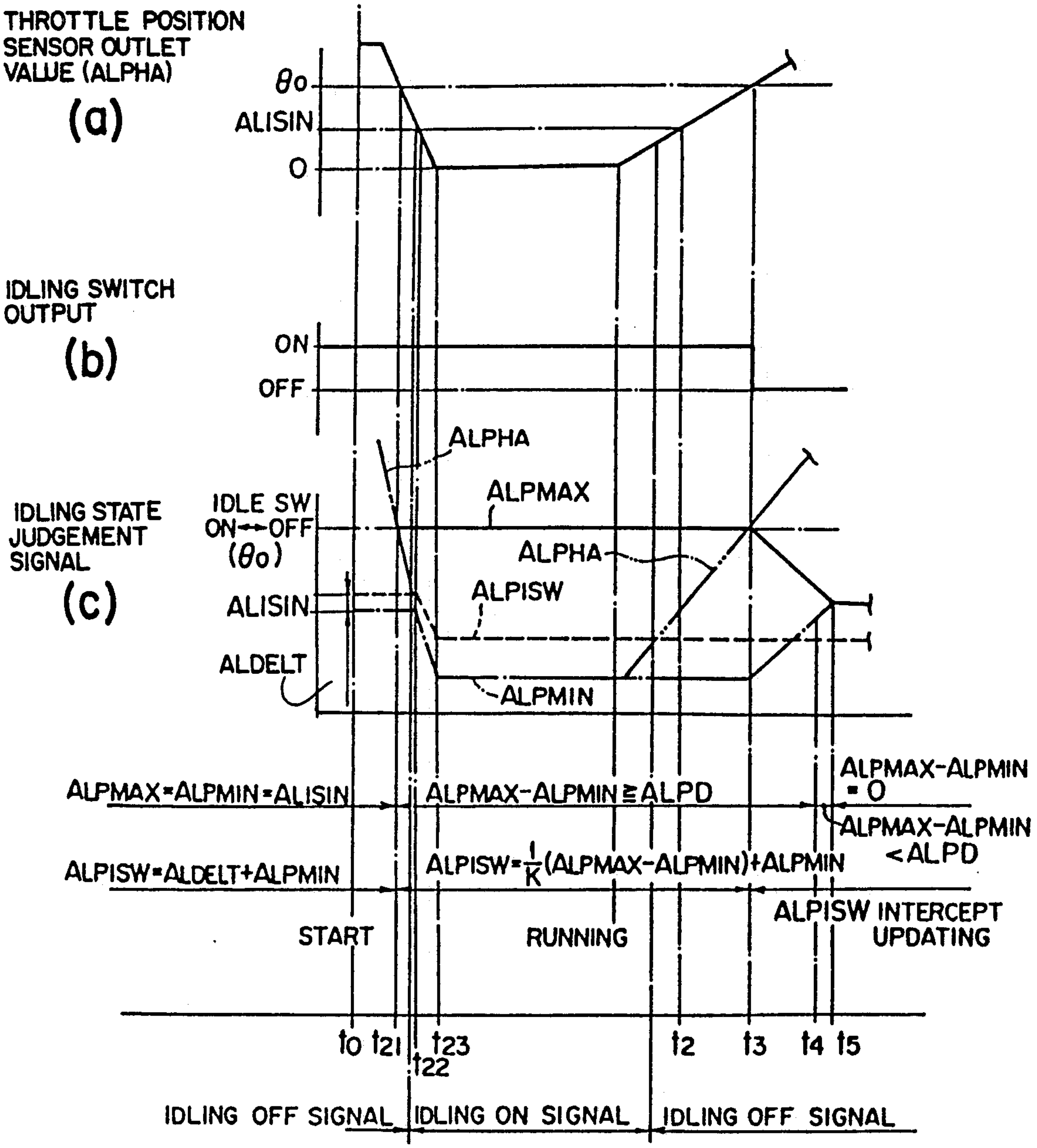

While executing the steps S104 to S108, if the output value ALPHA of the throttle position sensor 9 becomes smaller than the minimum output value ALPMIN (=ALISIN) stored in the memory means 20 at the lapsed time t22 shown in FIG. 7, the control advances from the steps S109 and S111 to the step S112. At the step S112 the minimum output value ALPMIN stored in the memory means 20 is updated to the output value ALPHA read at the step S108 (ALPMIN←ALPHA). Thereafter, at the step S113 the maximum and minimum output values ALPMAX and ALPMIN are read from the memory means 20.

Also in this case, it becomes that ALPMAX−ALPMIN $\neq 0$ and ALPMAX−ALPMIN $\geqq$ALPD. The control therefore advances via the steps S114 and S115 to the step S116 whereat the idling judgement comparison reference value ALPISW is calculated from the formula (1) and the idling judgement comparison reference value ALPISW stored at the step S118 in the memory means 20 is updated to the calculated comparison reference value ALPISW. Thereafter, the control returns to the step S103 (lapsed time t22 to t23 shown in FIG. 7).

When the output value ALPHA of the throttle position sensor 9 takes the minimum value representative of the fully closed state of the throttle valve 5, the minimum output value ALPMIN is not updated until the idle switch 10 changes to the OFF state, and the idle state judgement comparison reference value ALPISW is maintained unchanged (lapsed time t23 to t3 shown in FIG. 7).

The maximum output value ALPMAX is not updated after the lapsed time t21 shown in FIG. 7 until the idle switch 10 changes to the OFF state.

During Start Running Operation

In the case where the acceleration pedal is largely depressed for the start running operation after the engine entered into the idling operation upon release or slight depression of the acceleration pedal, the output value ALPHA of the throttle position sensor 9 gradually increases. At the step S109 the output value ALPHA read at the step S108 is compared with the initialized maximum output value ALPMAX (=ALISIN). If it is judged that the output value ALPHA is in excess of the maximum output value ALPMAX (=ALISIN) (ALPHA >ALISIN), then the control advances to the step S110 whereat the maximum output value ALPMAX stored in the memory means 20 is updated to the output value ALPHA read at the step S108. Thereafter, at the step S113 the maximum and minimum output values ALPMAX and ALPMIN are read from the memory means 20.

Since it becomes that ALPMAX−ALPMIN $\neq 0$ and ALPMAX −ALPMIN $\geqq$ALPD, the control advances via the steps S114 and S115 to the step S116 whereat the idling judgement comparison reference value ALPISW is calculated from the formula (1). At the step S118 the idling judgement comparison reference value ALPISW stored in the memory means 20 at the predetermined address is updated to the comparison reference value ALPISW calculated at the step S116. Thereafter the control returns to the step S103 (lapsed time t2 to t3).

During Acceleration Operation

Figure 6:
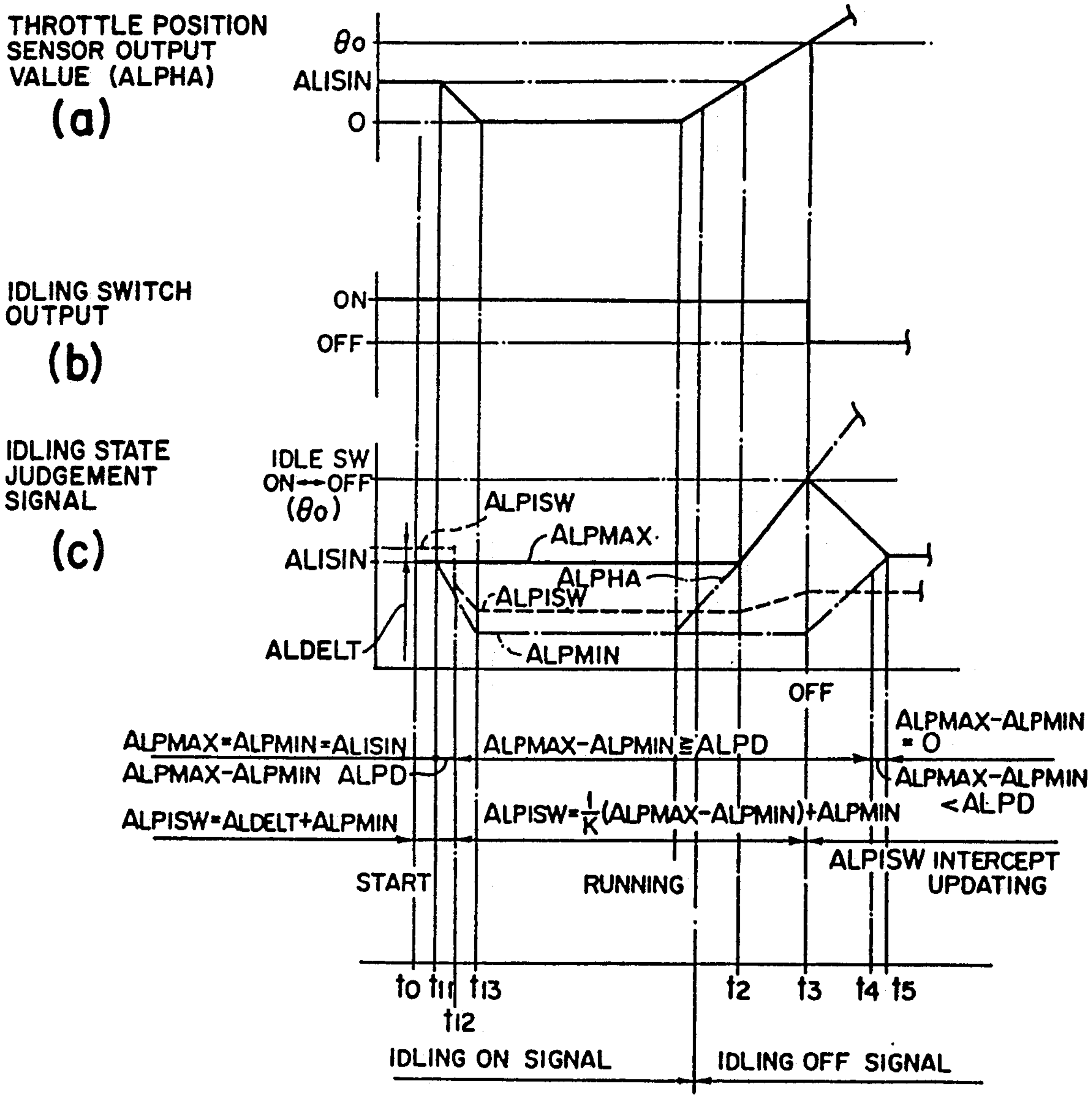

During the acceleration operation, i.e., after the lapsed time t3 shown in the timing charts of FIGS. 5 to 7, idling state judging signals change in the similar manner irrespective of the condition of engine starting operation. The acceleration operation will therefore be described with reference to the timing chart shown in FIG. 5.

During the acceleration operation, the opening degree of the throttle valve 5 becomes large. When the opening degree reaches the set opening degree $\theta 0$, the idle switch 10 turns OFF so that the control advances from the step S103 to the step S119 whereat it is judged whether the update interception flag FLAG1 is 1 or not. If 1, the control returns to the step S103. If not, the control advances to step S120.

Immediately after the idle switch 10 changes from the ON state to the OFF state during the acceleration operation, the update interception flag FLAG1 is not 1 so that the control advances to the step S120. At step S120, the counter C1 is cleared (C1 ←Φ), and then, at step S121, the counter C2 is incremented by 1 (C2 ←C2+1). At step S122, the contents of the idling OFF counter C2 incremented at step S121 are compared with the set value tn. If C2 <tn, the control returns to the step S103. If C2 ≧tn, i.e., if the OFF state of the idle switch 10 continues for the predetermined period tn (e.g., 10 msec), the control advances to a step S123 whereat the idling OFF counter C2 is cleared (C2 ←Φ).

At a step S124 the maximum and minimum output values ALPMAX and ALPMIN stored in the memory means 20 are compared with each other. If ALPMAX >ALPMIN, the control advances to a step S125. If ALPMAX ≦ALPMIN, the control advances to a step S126.

Since ALPMAX >ALPMIN immediately after the idle switch 10 changes to the OFF state, the control advances to a step S125 whereat the maximum output value ALPMAX stored in the memory means 20 is updated to the value subtracted by the set value DELTID (ALPMAX ←ALPMAX−DELTID), and the minimum output value ALPMIN is updated to the value added with the set value DELTID (ALPMIN ←ALPMIN+DELTID). Thereafter, the control returns to the step S103 (lapsed time t3 to t5).

During the acceleration operation, the maximum and minimum output values ALPMAX and ALPMIN stored in the memory means 20 become near each other by every operation cycle of the program. If it is judged eventually at the step S124 that ALPMAX ≦ALPMIN, it is set at the step S126 that ALPMAX ALPMIN. Next, at a step S127 the update interception flag FLAG1 is set to "1" to return to the step S103 (lapsed time t5 to t6).

As apparent from the foregoing description, during the OFF state of the idle switch 10, updating the idling judgement comparison reference value ALPISW is intercepted so that the value ALPISW is maintained as the value immediately before the idle switch 10 changes from the ON state to the OFF state, thereby avoiding an erroneous idling state judgement immediately after the idle switch 10 again changes from the OFF state to the ON state.

During Deceleration Operation

During the deceleration operation, upon release of the acceleration pedal, the idle switch 10 changes from the OFF state to the ON state at the throttle valve opening degree $\theta 0$. Then, the program from the steps S103 to S108 is executed. At step S109, the output value ALPHA of the throttle position sensor 9 read at the step S108 is compared with the maximum output value ALPMAX stored in the memory means 20.

Immediately after the idle switch 10 changes from the OFF state to the ON state, the output value ALPHA of the throttle position sensor 9 gradually changes to small value. Accordingly, the output value ALPHA read at step S108 is larger than the maximum output value ALPMAX stored in the memory means 20 (ALPHA >ALPMAX). The control therefore advances from the step S109 to step S110 whereat the maximum output value ALPMAX is updated to the output value ALPHA read at step S108 (ALPMAX ←ALPHA). At step S113 the maximum and minimum output values ALPMAX and ALPMIN are read from the memory means 20.

In this case, since the minimum output value ALPMIN is not still updated, it becomes that ALPMAX−ALPMIN ≠0 and ALPMAX−ALPMIN ≧ALPD. The control therefore advances from steps S114 and S115 to step S116 whereat the idling judgement comparison reference value ALPISW is calculated from the formula (1) At the step S118, the idling judgement comparison reference value ALPISW stored in the memory means 20 at the predetermined address is updated to the idling judgement comparison reference value ALPISW calculated at the step S116. Thereafter, the control returns to step S103 (lapsed time t6).

The output value ALPHA of the throttle position sensor 9 decreases further, and when it becomes smaller than the minimum output value ALPMIN stored in the memory means 20 at the lapsed time t5 (ALPHA <ALPMIN), the control advances from the step S111 to the step S112 whereat the minimum output value ALPMIN stored in the memory means 20 is updated to the output value ALPHA read at the step S108 (ALPMIN ←ALPHA). Thereafter, the maximum and minimum output values ALPMAX and ALPMIN are read from the memory means 20 at the step S113.

In this case, since the difference between the maximum and minimum output values ALPMAX and ALPMIN becomes large, it becomes that ALPMAX−ALPMIN ≠0 and ALPMAX−ALPMIN ≧ALPD. The control therefore advances from the steps S114 and S115 to the step S116 whereat the idling judgement comparison reference value ALPISW is calculated from the formula (1). At the step S118, the idling judgement comparison reference value ALPISW stored in the memory means 20 at the predetermined address is updated to the idling judgement comparison reference value calculated at the step S116. Thereafter, the control returns to the step S103 (lapsed time t7).

As appreciated from the above description, since there is provided difference between timings to update the maximum and minimum output values ALPMAX and ALPMIN during the transition period (lapsed time t2 and t3, or t6 and t7), the change in the idling judgement comparison reference value ALPISW becomes gentle to thereby ensure a more correct idle state judgement.

Further, only during the ON state of the idle switch 10, the maximum or minimum output value ALPMAX or ALPMIN stored in the memory means 20 is updated, through learning, in accordance with the output value ALPHA of the throttle position sensor 9. In accordance with the updated maximum and minimum output values ALPMAX and ALPMIN, the idling judgement comparison reference value ALPISW is calculated to update the value ALPISW, through learning. When the idle switch 10 changes from the ON state to the OFF state, updating the idling judgement comparison reference value ALPISW is intercepted, and the maximum output value ALPMAX is updated to the value subtracted by the set value DELTID whereas the minimum output value ALPMIN is updated to the value added with the set value DELTID. When it becomes that ALPMAX ≦ALPMIN, it is set that ALPMAX =ALPMIN. Then, updating the maximum and minimum output values ALPMAX and ALPMIN is intercepted. When the idle switch 10 changes again to the ON state, learning resumes with respect to the maximum and minimum output values ALPMAX and ALPMIN and idling judgement comparison reference value ALPISW. Therefore, the correct idling state judgement to be described later can be carried out without any influence from drift of the output value ALPHA of the throttle position sensor 9 caused by a temperature change, and from aged deterioration of the throttle valve 9.

Idling State Judging Procedure

Figure 4:
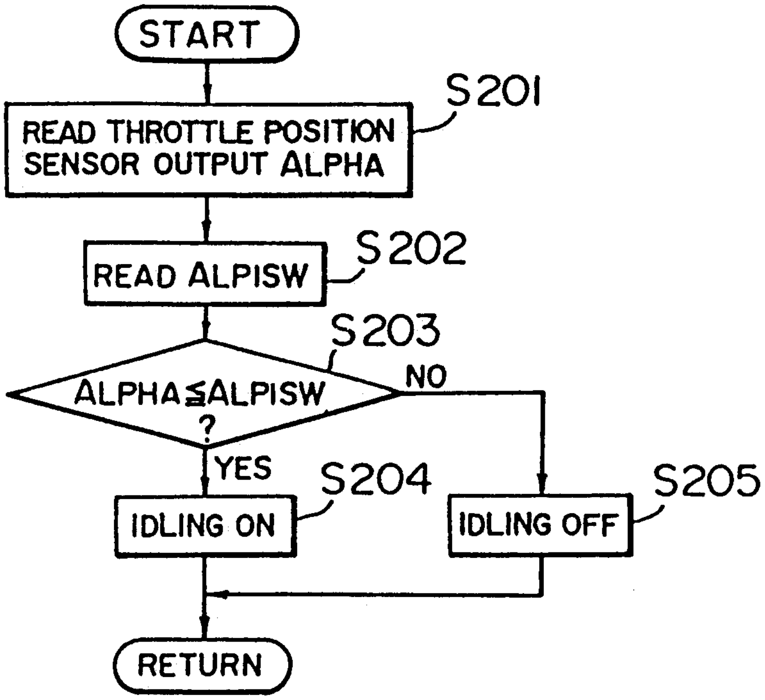
Figure 8:
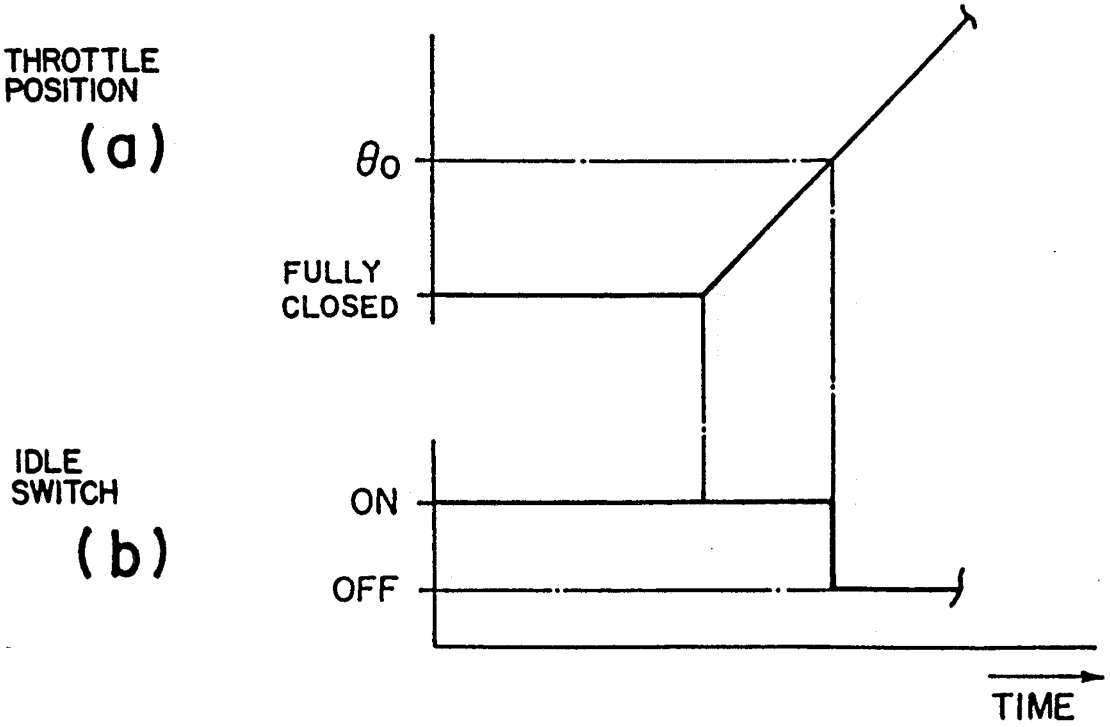
FIG. 8 PRIOR ART
FIGS. 8(*a*) and 8(*b*) are graphs illustrating the correlation between a throttle valve opening degree and the operation of the idle switch.

As shown in FIG. 4, at a step S201, the output value ALPHA of the throttle position sensor 9 is read. At a step S202, the idling judgement comparison reference value ALPISW is read from the memory means 20. At a step S203, the output value ALPHA read at the step S201 is compared with the idling judgement comparison reference value ALPISW read from the memory means 20. If it is judged that ALPHA ≦ ALPISW, the control advances to a step S204 whereat an idling ON signal is outputted. If it is judged at the step S203 that ALPHA > ALPISW, the control advances to a step S205 whereat an idling OFF signal is outputted.

As apparent from the timing charts shown in FIGS. 5 to 7, the idling judgement is made more correctly than the case where an output signal from the idle switch 10 is only used in judging the idling state, and the idling ON signal is obtained correctly in dependence on the fully closed state of the throttle valve.

The control unit 17 performs the air-fuel ratio control, ignition timing control, and idling state engine speed control, in accordance with the output signal from the idling state determined means 29.

If the idle switch 10 does not change to the ON state even once after the control unit 17 was powered, if the output value of the throttle position sensor 9 is incorrect, or if the control unit is under a self-diagnosis, the idling state are discriminated in accordance with an output signal from the idle switch 10.

As described so far, according to the present invention, it is possible to correctly detect the fully closed state of the throttle valve without a necessity of severe setting of the idle switch, while avoiding an erroneous judgement, thereby improving the idling state controllability and air-fuel ratio controllability. As a result, not only the acceleration and deceleration performance is improved but also the fuel consumption and exhaust gas emission are improved.

Furthermore, according to the present invention, since idling judgement comparison reference value is setting in accordance with not only minimum output value of the throttle position sensor but also maximum output value during the ON state of the idle switch, the idling state is certainly detected.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An engine idling control apparatus comprising:
- an idle switch responsive to an opening condition of a throttle valve;
- idle switch state judging means for judging the idling state responsive to output from said idle switch;
- a throttle position sensor for detecting the opening degree of said throttle valve;
- learning means for detecting maximum and minimum values of output from said throttle position sensor and for updating the maximum and minimum values, when said idle switch state judging means judges the idling state;
- comparison reference value setting means for setting an idling judgement comparison reference value in accordance with the maximum and minimum values updated by said max/min value learning means; and
- idling state judging means for judging proper idling state by comparing said idling judgement comparison reference value with output the said throttle position sensor.

2. The engine idling control apparatus according to claim 1, wherein
- said idle switch turns on/off at the point where said throttle valve is opened slightly from the fully closed state.

3. The engine idling control apparatus according to claim 1, wherein
- said comparison reference value setting means updates said idling judgement comparison reference value in accordance with the maximum and minimum values updated by said max/min value updating means, when said idle switch state judging means judges the idling state.

4. The engine idling control apparatus according to claim 1, wherein
- said learning means updates said maximum value by subtracting first predetermined value and said minimum value by adding second predetermined value until both values become the same when said idle switch state judging means does not judge the idling state.

5. The engine idling control apparatus according to claim 4, wherein
- said comparison reference value setting means updates said idling judgement comparison reference value in response to said maximum and minimum values when said idle switch state judging means judges the idling state, and
- said comparison reference value setting means intercepts, until said idle switch state judging means judges the next idle state, updating said idling judgement comparison reference value when said idle switch state judging means does not judge the idling state.

* * * * *